United States Patent
Shimizu

[11] 3,737,214
[45] June 5, 1973

[54] WIDE ANGLE FISHEYE LENS
[75] Inventor: Yoshiyuki Shimizu, Kanagawa-ken, Kawasaki, Japan
[73] Assignee: Nippon Kogaku K.K., Tokyo, Japan
[22] Filed: Sept. 29, 1971
[21] Appl. No.: 184,782

[30] Foreign Application Priority Data
Sept. 30, 1970 Japan..............................45/85420

[52] U.S. Cl. ................350/214, 350/177, 350/198
[51] Int. Cl...........................G02b 9/64, G02b 13/06
[58] Field of Search.....................350/198, 177, 214, 350/215, 216

[56] References Cited
UNITED STATES PATENTS
3,524,697   8/1970   Isshiki et al.....................350/198 UX
3,589,798   6/1971   Ogura................................350/198

Primary Examiner—John K. Corbin
Attorney—Fitzpatrick, Cella, Harper & Scinto

[57] ABSTRACT

A fisheye lens whose angle of field is as wide as 220° and whose forward lens group comprises three negative meniscus lenses with their convex surfaces facing the object, a biconcave lens and a positive lens disposed adjacent the biconcave lens, all these lenses being arranged in the named order in the direction away from the object so as to satisfy predetermined conditions.

3 Claims, 12 Drawing Figures

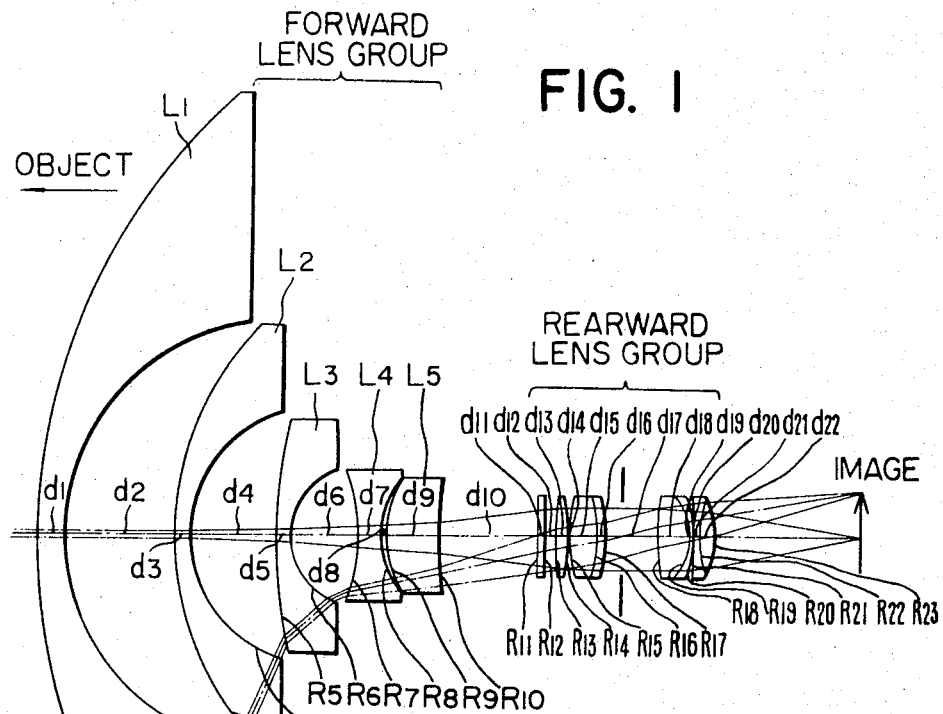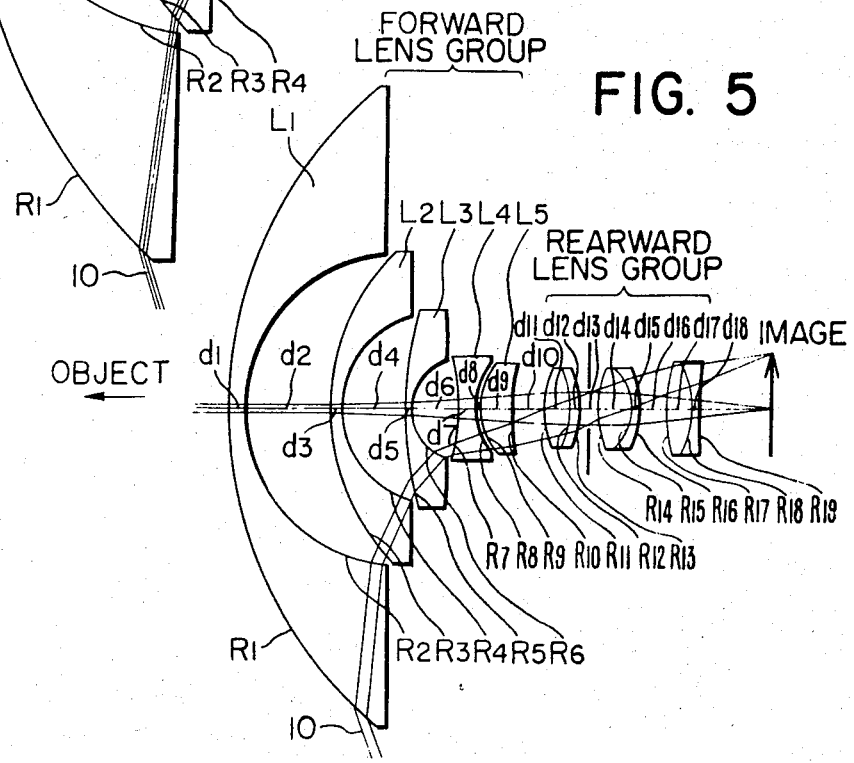

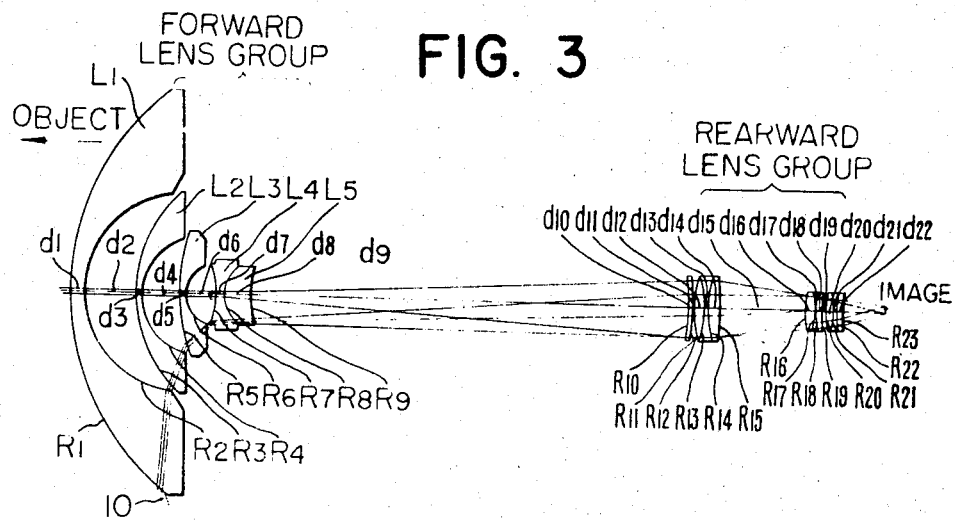

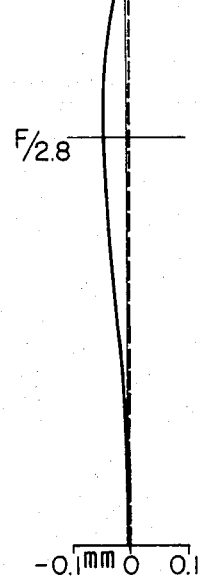

FIG. 6A
— SPHERICAL ABERRATION
---- SINE CONDITION

F/4
F/3.6

-0.5 mm 0 0.5

FIG. 6B
— SAGITTAL
---- MERIDIONAL

WIDE ANGLE FISHEYE LENS

BACKGROUND OF THE INVENTION

1. Field of the Invention

This invention relates to a fisheye lens, and more particularly to the forward lens group of such lens.

2. Description of the Prior Art

The fisheye lens differs in the mode of projection from ordinary lenses and has a 100 percent distortion in its half angle of field 90°. This fact indicates that the fisheye lens enables a view in the half angle of field 90° to be focused within a limited range. In order to provide this feature, a lens group having a negative refractive power is disposed in the forward portion of the optical system to thereby produce a negative distortion of great magnitude.

The shape of such a negative lens group may roughly be divided into two types. In one group the radius of curvature of the first surface of the optical system has a large value as compared with the effective diameter of that surface, as is disclosed in German Pat. 672,393, for example. In the other group the first surface convex is mounted on the object side of the optical system and the radius of curvature of the first surface is smaller than the effective diameter thereof, as is disclosed in Japanese Patent Publication No. 18718/1964. In both of these types, a stop is usually disposed rearwardly of the first surface.

The negative lens group of the first-named type contributes to the reduction of the dimensions of the entire optical system, while at the same time the large angle of incidence of oblique rays on the first surface thereof causes the rays to be greatly refracted in serving surface. As a result, the cross-sectional area of the light beam after being refracted is much greater than that refracted before and this in turn may result not only in an insufficient amount of peripheral light but also in aberrations created due to the sudden refraction of the light. When the first surface of the optical system is flat, as in the aforesaid German patent, the amount of peripheral light in the half angle of field 90° becomes zero. It will thus be readily apparent that the lens group of this type experiences substantial difficulty when serving as a fisheye lens whose half angle of field exceeds 90°.

In the case of the second-named type, the dimensions of the lens system is greater, but the greater depth of the first surface results in a smaller angle of incidence of oblique rays upon this surface and, accordingly, provides a smaller refraction of light in the same surface. This, in turn, enables the cross-sectional areas of the light beam, before and after refraction, to be maintained at a modest level and at a ratio of approximately 1:1. Thus, the amount of peripheral light is prevented from becoming insufficient and is actually greater than the amount of light passing through the center of the field. However, the smaller refractive power of the first surface makes it necessary that the second and third surfaces refract the light rays more in the direction for making them parallel to the optic axis.

This means that the second surface must have a radius of curvature smaller than the effective diameter thereof. In other words, it is necessary that the negative surfaces of the successive lens forming the forward portion of the fisheye lens system, take such shapes as are required to bend the oblique rays little by little, i.e. such shapes that those surfaces are bent more toward the image side.

Thus, a fisheye lens having a forward lens group or the type aforesaid involves substantial difficulty in the shaping of that lens group and requires greater number of lens components. However, it is advantageous when the performance is the primary consideration, because it can provide a greater amount of peripheral light and can provide a greater increase in the angle of field.

SUMMARY OF THE INVENTION

The present invention resides in the provision of a fisheye lens whose half angle of field is made as wide as from 90° to 110° by dividing a negative meniscus lens into three components. According to the present invention, the forward lens group of the fisheye lens system comprises three negative meniscus lenses disposed with their convex surfaces facing the object, a biconcave lens and a positive lens disposed adjacent the biconcave lens, all these lenses being arranged in the named order in the direction away from the object. In one form of my invention, the positive lens is cemented to the biconcave lens, and in another form of the invention the positive lens is spaced apart from the biconcave lens, leaving an air gap therebetween. The surface of the positive lens which is adjacent the biconcave lens is convex. These lenses are arranged so as to satisfy certain conditions which will be described more fully hereinafter.

The invention will become fully apparent from the following description of several embodiments thereof, taken in conjunction with the accompanying drawings.

BRIEF DESCRIPTION OF THE DRAWINGS

FIG. 1 is a longitudinal sectional view of Example I of the present invention;

FIGS. 2A, B and C are graphical illustrations of the spherical aberration, astigmatism and distortional aberration in Example I;

FIG. 3 is a longitudinal sectional view of Example II of the present invention;

FIGS. 4A, B and C are graphs similar to FIG. 2, but relating to Example II;

FIG. 5 is a longitudinal sectional view of Example III of the present invention; and FIGS. 6A, B and C are graphs similar to FIG. 2, but relating to Example III.

DESCRIPTION OF THE PREFERRED EMBODIMENTS

Referring to the drawings, particularly to FIGS. 1, 3 or 5, the fisheye lens of the present invention includes a forward lens group which comprises three negative meniscus lenses L1,L2 and L3 disposed with their convex surfaces facing the object, a biconcave lens L4, and a positive lens L5. The positive lens L5 may be cemented to the biconcave lens L4 as shown in FIGS. 1 and 3, or it may be spaced therefrom leaving an air gap, as shown in FIG. 5. The surface of the lens L5 which is adjacent the lens L4 is convex. These lenses are arranged in the named order in the direction away from the object, so as to satisfy the following relations:

$\phi_1/R_1 > 1.0$ $(\phi_3/R_5) > 1.0, 2.0 > (\phi_2/R_2) > 1.5, 2 > \phi_4/R_4 > 1.5$ $2 > \phi_6/R_6 > 1.5$, where $R_1$ to $R_6$ represent the radii of curvature of the successive surfaces of the lenses L1 to L3 and $\phi_1$ to $\phi_6$ represents the effective diameters of these surfaces. These conditions serve to allow light rays 10 incident at angles near or greater than the angle of field of 90° to be readily refracted, and they are important for determining the type and nature of the fisheye lens. The surface of the lens L3 which is adjacent the lens L2 has a radius of curvature greater than the effective diameter of the same surface, because oblique rays entering the lens L3 have already been refracted by the preceding lenses L1 and L2.

It is for the same reason that the lens L4 is a biconcave lens whose surface adjacent the lens L3 is concave with respect to the lens L3. The light refracted by the lenses L1 to L3 is further refracted by the lens L4 so as to pass through the lens 5 and enter a succeeding positive lens group at a small angle of incidence, to thereby effectively maintain the flatness of the image field.

If the dispersive powers of the negative lenses L4 and the positive lens L5 are represented by $V_4$ and $V_5$ respectively, then they are in the following relation:

$$V_4 > V_5$$

Because the lenses L1 to L4 are all negative lenses, this elation serves to correct the aberrations in the magnification surfaces.

The described construction of the forward lens group for a fisheye lens provides an angle of field as wide as 220°, but such a lens group whose focal length is negative must be followed by a positive lens group because it cannot form real images. The shape of the positive lens group subsequent to the forward group has no essential significance to the present invention, as will be readily apparent from the various examples of the present invention shown below. In the following tables, R represents the curvature of the successive surfaces of the lens, (including the rearward lens group), $\phi$ represents the effective diameter of the successive surfaces of the lens, $d$ represents the lens thicknesses or air gaps between lenses, $n$ the refractive indices of the glasses forming the lens for the yellow helium-d line of the spectrum, and $Vd$ the Abbe numbers of the lens glasses.

EXAMPLE I

[Focal length of the entire system f=6.3; Focal length of the rearward lens group B.f.=37.657; Brightness F/2.8; Angle of field 220°]

| | | | | |
|---|---|---|---|---|
| $R_1=+143.47$ | $\phi_1=213$ | $d_1=7.0$ | $n_1=1.5168$ | $Vd=64.2$ |
| $R_2=+52.5$ | $\phi_2=104.6$ | $d_2=28.0$ | | |
| $R_3=+76.4$ | $\phi_3=100.0$ | $d_3=3.8$ | | |
| $R_4=+31.521$ | $\phi_4=61.0$ | $d_4=21.8$ | $n_2=1.5168$ | $Vd=64.2$ |
| $R_5=+150.00$ | $\phi_5=56.0$ | $d_5=3.0$ | $n_3=1.5168$ | $Vd=64.2$ |
| $R_6=+17.1$ | $\phi_6=33.0$ | $d_6=16.5$ | | |
| $R_7=-60.0$ | | $d_7=7.0$ | $n_4=1.62041$ | $Vd=60.3$ |
| $R_8=+22.625$ | | $d_8=0.6$ | | |
| $R_9=+23.9$ | | $d_9=12.6$ | $n_5=1.72825$ | $Vd=28.3$ |
| $R_{10}=+78.988$ | | $d_{10}=25.0$ | | |
| $R_{11}=\infty$ | | $d_{11}=1.8$ | $n_6=1.51823$ | (Filter) |
| $R_{12}=\infty$ | | $d_{12}=2.8$ | | |
| $R_{13}=+278.333$ | | $d_{13}=3.00$ | $n_7=1.64831$ | $Vd=33.8$ |
| $R_{14}=-185.420$ | | $d_{14}=0.1$ | | |
| $R_{15}=+52.03$ | | $d_{15}=7.0$ | $n_8=1.53375$ | $Vd=55.4$ |
| $R_{16}=-28.5$ | | $d_{16}=2.0$ | $n_9=1.7725$ | $Vd=49.5$ |
| $R_{17}=-77.0$ | | $d_{17}=13.0$ | | |
| $R_{18}=-45.0$ | | $d_{18}=8.0$ | $n_{10}=1.51823$ | $Vd=59.0$ |
| $R_{19}=-14.4$ | | $d_{19}=0.6$ | $n_{11}=1.79631$ | $Vd=40.8$ |
| $R_{20}=-34.5$ | | $d_{20}=0.1$ | | |
| $R_{21}=-110.0$ | | $d_{21}=1.0$ | $n_{12}=1.71736$ | $Vd=29.5$ |
| $R_{22}=+35.0$ | | $d_{22}=3.5$ | $n_{13}=1.5168$ | $Vd=64.2$ |
| $R_{23}=-25.763$ | | | | |

EXAMPLE II

[Focal length of the entire system f=2.0; Focal length of the rearward lens group B.f.=22.306; Brightness F/2; Angle of field 220°]

| | | | | |
|---|---|---|---|---|
| $R_1=+143.47$ | $\phi_1=215$ | $d_1=7.0$ | $n_1=1.51729$ | $Vd=64.3$ |
| $R_2=+52.63$ | $\phi_2=104.5$ | $d_2=28.0$ | | |
| $R_3=+76.4$ | $\phi_3=101.2$ | $d_3=3.8$ | $n_2=1.51707$ | $Vd=64.1$ |
| $R_4=+33.0$ | $\phi_4=63.0$ | $d_4=21.2$ | | |
| $R_5=+125.114$ | $\phi_5=57.2$ | $d_5=3.0$ | $n_3=1.51707$ | $Vd=64.1$ |
| $R_6=+17.1$ | $\phi_6=33.0$ | $d_6=16.5$ | | |
| $R_7=-40.0$ | | $d_7=5.0$ | $n_4=1.69037$ | $Vd=54.9$ |
| $R_8=+20.0$ | | $d_8=15.0$ | $n_5=1.68871$ | $Vd=31.1$ |
| $R_9=+139.1$ | | $d_9=240.00$ | | |
| $R_{10}=+600.0$ | | $d_{10}=3.0$ | $n_6=1.61995$ | $Vd=60.4$ |
| $R_{11}=-234.7$ | | $d_{11}=0.1$ | | |
| $R_{12}=+53.0$ | | $d_{12}=7.0$ | $n_7=1.48617$ | $Vd=82.0$ |
| $R_{13}=-53.0$ | | $d_{13}=1.2$ | $n_8=1.60321$ | $Vd=38.1$ |
| $R_{14}=+55.0$ | | $d_{14}=4.7$ | $n_9=1.61624$ | $Vd=31.0$ |
| $R_{15}=-788.91$ | | $d_{15}=48.1$ | | |
| $R_{16}=+48.789$ | | $d_{16}=4.7$ | $n_{10}=1.48617$ | $Vd=82.0$ |
| $R_{17}=-44.5$ | | $d_{17}=0.7$ | $n_{11}=1.60294$ | $Vd=38.1$ |
| $R_{18}=+63.1$ | | $d_{18}=4.0$ | $n_{12}=1.61624$ | $Vd=31.0$ |
| $R_{19}=+1,077.78$ | | $d_{19}=1.0$ | | |
| $R_{20}=+40.0$ | | $d_{20}=4.7$ | $n_{13}=1.48617$ | $Vd=82.0$ |
| $R_{21}=-60.0$ | | $d_{21}=0.8$ | $n_{14}=1.68871$ | $Vd=31.1$ |
| $R_{22}=+60.0$ | | $d_{22}=4.0$ | $n_{15}=1.61995$ | $Vd=60.4$ |
| $R_{23}=-1,466.043$ | | | | |

EXAMPLE III

[Focal length of the entire system f=10.2; Focal length of rearward lens group B.f.=25.09; Brightness F/4; Angle of field 220°]

| | | | | |
|---|---|---|---|---|
| $R_1=+143.47$ | $\phi_1=215$ | $d_1=7.0$ | $n_1=1.5186$ | $Vd=64.2$ |
| $R_2=+52.5$ | $\phi_2=104.5$ | $d_2=28.0$ | | |
| $R_3=+76.4$ | $\phi_3=101.2$ | $d_3=3.8$ | $n_2=1.5168$ | $Vd=64.2$ |
| $R_4=+31.521$ | $\phi_4=63.0$ | $d_4=21.8$ | | |
| $R_5=+125.0$ | $\phi_5=56.0$ | $d_5=3.0$ | $n_3=1.5168$ | $Vd=64.2$ |
| $R_6=+17.1$ | $\phi_6=33.0$ | $d_6=15.5$ | | |
| $R_7=-98.0$ | | $d_7=7.0$ | $n_4=1.62041$ | $Vd=60.3$ |
| $R_8=+25.5$ | | $d_8=0.7$ | | |
| $R_9=-27.16$ | | $d_9=12.6$ | $n_5=1.72825$ | $Vd=28.3$ |
| $R_{10}=+180.0$ | | $d_{10}=10.0$ | | |
| $R_{11}=+31.0$ | | $d_{11}=10.0$ | $n_6=1.51454$ | $Vd=54.6$ |
| $R_{12}=-29.0$ | | $d_{12}=2.0$ | $n_7=1.7847$ | $Vd=26.1$ |
| $R_{13}=-58.0$ | | $d_{13}=8.0$ | | |
| $R_{14}=+65.00$ | | $d_{14}=11.3$ | $n_8=1.51454$ | $Vd=54.6$ |
| $R_{15}=-16.0$ | | $d_{15}=1.6$ | $n_9=1.7495$ | $Vd=35.0$ |
| $R_{16}=-36.14$ | | $d_{16}=10.0$ | | |
| $R_{17}=+40.0$ | | $d_{17}=10.0$ | $n_{10}=1.56384$ | $Vd=60.8$ |
| $R_{18}=-26.0$ | | $d_{18}=1.0$ | $n_{11}=1.71736$ | $Vd=29.5$ |
| $R_{19}=-679.823$ | | | | |

It will thus be seen that the present invention does indeed provide an improved wide angle fisheye lens system which is superior in simplicity and efficiency as compared to prior art such systems.

Although certain particular embodiments of the invention are herein disclosed for purposes of explanation, various modifications thereof, after study of this specification, will be apparent to those skilled in the art to which the invention pertains.

What is claimed and desired to be Secured by Letters Patent is:

1. A wide angle fisheye lens system including a forward lens group and a rearward lens group of positive retractive power disposed rearwardly of said forward lens group, said forward lens group comprising three negative meniscus lenses convex to the object side of the system, a biconcave lens and a positive lens disposed adjacent said biconcave lens, said lenses being arranged in the named order in the direction away from the object, the numerical data of said system, assuming $f=6.3$; B.f. = 37.657; F/2.8; $2\omega=220°$ being as follows:

$R_1 = +143.47$  $\phi_1 = 213$   $d_1 = 7.0$  $n_1 = 1.5168$ $Vd = 64.2$ $R_2 = +52.5$  $\phi_2 = 104.6$  $d_2 = 28.0$ $R_3 = +76.4$  $\phi_3 = 100.0$  $d_3 = 3.8$  $n_2 = 1.5168$  $Vd = 64.2$ $R_4 = +31.521$  $\phi_4 = 61.0$  $d_4 = 21.8$ $R_5 = +150.00$  $\phi_5 = 56.0$  $d_5 = 3.0$  $n_3 = 1.5168$  $Vd = 64.2$ $R_6 = +17.1$  $\phi_6 = 33.0$  $d_6 = 16.5$ $R_7 = -60.0$  $d_7 = 7.0$  $n_4 = 1.62041$  $Vd = 60.3$ $R_8 = +22.625$  $d_8 = 0.6$ $R_9 = +23.9$  $d_9 = 12.6$  $n_5 = 1.72825$  $Vd = 28.3$ where $R_1$ to $R_9$ represents the radii of curvature; $\phi_1$ to $\phi_6$ represents the effective diameters; $d_1$ to $d_9$ represents the thickness of the lenses and the air gap between lenses; $n_1$ to $n_5$ represents the refractive indices of the glasses forming the lens for the yellow helium − d line of the spectrum; and $Vd$ represents the Abbe numbers of the lenses.

2. A wide angle fisheye lens system including a forward lens group and a rearward lens group of positive refractive power disposed rearwardly of said forward lens group, said forward lens group comprising three negative meniscus lenses convex to the object side of the system, a biconcave lens and a positive lens disposed adjacent said biconcave lens, said lenses being arranged in the named order in the direction away from the object, the numerical data of said system, assuming $f = 2.0$; B.f. $= 22.306$; F/2; $2\omega = 220°$ being as follows:

$R_1 = + 143.47$ $\phi_1 = 215$ $d_1 = 7.0$ $n_1 = 1.51729$ $Vd = 64.3$
$R_2 = + 52.63$ $\phi_2 = 104.5$ $d_2 = 28.0$
$R_3 = + 76.4$ $\phi_3 = 101.2$ $d_3 = 3.8$ $n_1 = 1.51707$ $Vd = 64.1$
$R_4 = + 33.0$ $\phi_4 = 63.0$ $d_4 = 21.2$
$R_5 = + 125.114$ $\phi_5 = 57.2$ $d_5 = 3.0$ $n_3 = 1.51707$ $Vd = 64.1$
$R_6 = + 17.1$ $\phi_6 = 33.0$ $d_6 = 16.5$ $R_7 = - 40.0$     $d_7 = 5.0$ $n_4 = 1.69037$ $Vd = 54.9$
$R_8 = + 20.0$     $d_8 = 15.0$ $n_5 = 1.68871$ $Vd = 31.1$
$R_9 = + 139.1$     $d_9 = 240.00$ where $R_1$ to $R_9$ represents the radii of curvature; $\phi_1$ to $\phi_6$ represents the effective diameters; $d_1$ to $d_9$ represents the thickness of the lenses and the air gap between lenses; $n_1$ to $n_5$ represents the refractive indices of the glasses forming the lens for the yellow helium-d line of the spectrum; and $Vd$ represents the Abbe numbers of the lenses.

3. A wide angle fisheye lens system including a forward lens group and a rearward lens group of positive refractive power disposed rearwardly of said forward lens group, said forward lens group comprising three negative meniscus lenses convex to the object side of the system, a biconcave lens and a positive lens disposed adjacent said biconcave lens, said lenses being arranged in the named order in the direction away from the object, the numerical data of said system, assuming $f = 10.2$; B.f. $= 25.09$; F/4; $2\omega = 220°$ being as follows:

$R_1 = + 143.7$ $\phi_1 = 215$ $d_1 = 7.0$ $n_1 = 1.5168$ $Vd = 64.2$
$R_2 = + 52.5$ $\phi_2 = 104.5$ $d_2 = 28.0$
$R_3 = + 76.4$ $\phi_3 = 101.2$ $d_3 = 3.8$ $n_2 = 1.5168$ $Vd = 64.2$
$R_4 = + 31.521$ $\phi_4 = 63.0$ $d_4 = 21.8$
$R_5 = + 125.0$ $\phi_5 = 56.0$ $d_5 = 3.0$ $n_3 = 1.5168$ $Vd = 64.2$
$R_6 = + 17.1$ $\phi_6 = 33.0$ $d_6 = 15.5$ $R_7 = - 90.0$     $d_7 = 7.0$ $n_4 = 1.62041$ $Vd = 60.3$
$R_8 = + 25.5$     $d_8 = 0.7$
$R_9 = + 27.16$     $d_9 = 12.6$ $n_5 = 1.72825$ $Vd = 28.3$ where $R_1$ to $R_9$ represents the radii of curvature; $\phi_1$ to $\phi_6$ represents the effective diameters; $d_1$ to $d_9$ represents the thickness of the lenses and the air gap between lenses; $n_1$ to $n_5$ represents the refractive indices of the glasses forming the lens for the yellow helium-d line of the spectrum; and $Vd$ represents the Abbe numbers of the lenses.

* * * * *